United States Patent Office 3,162,024
Patented Dec. 22, 1964

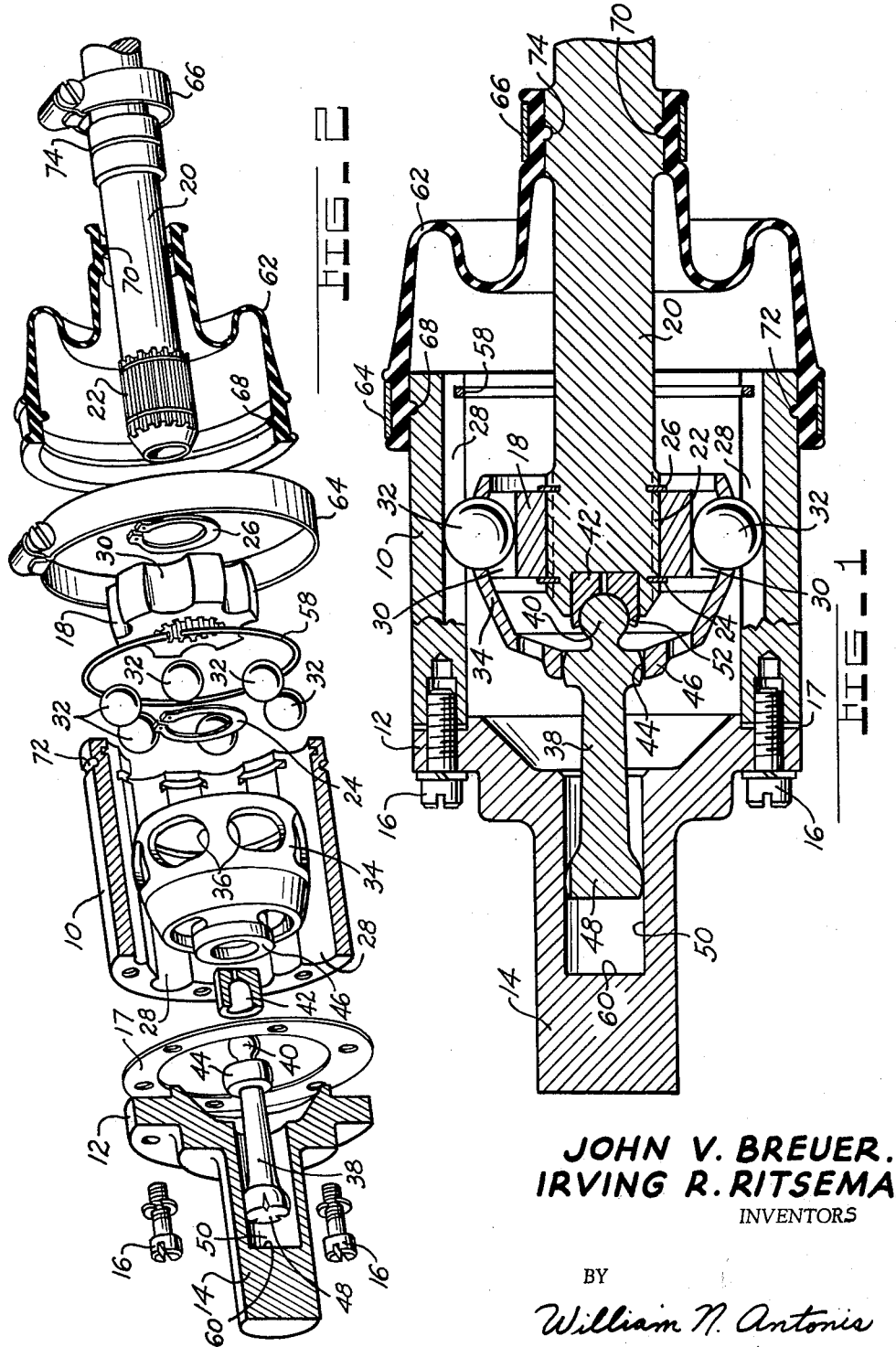

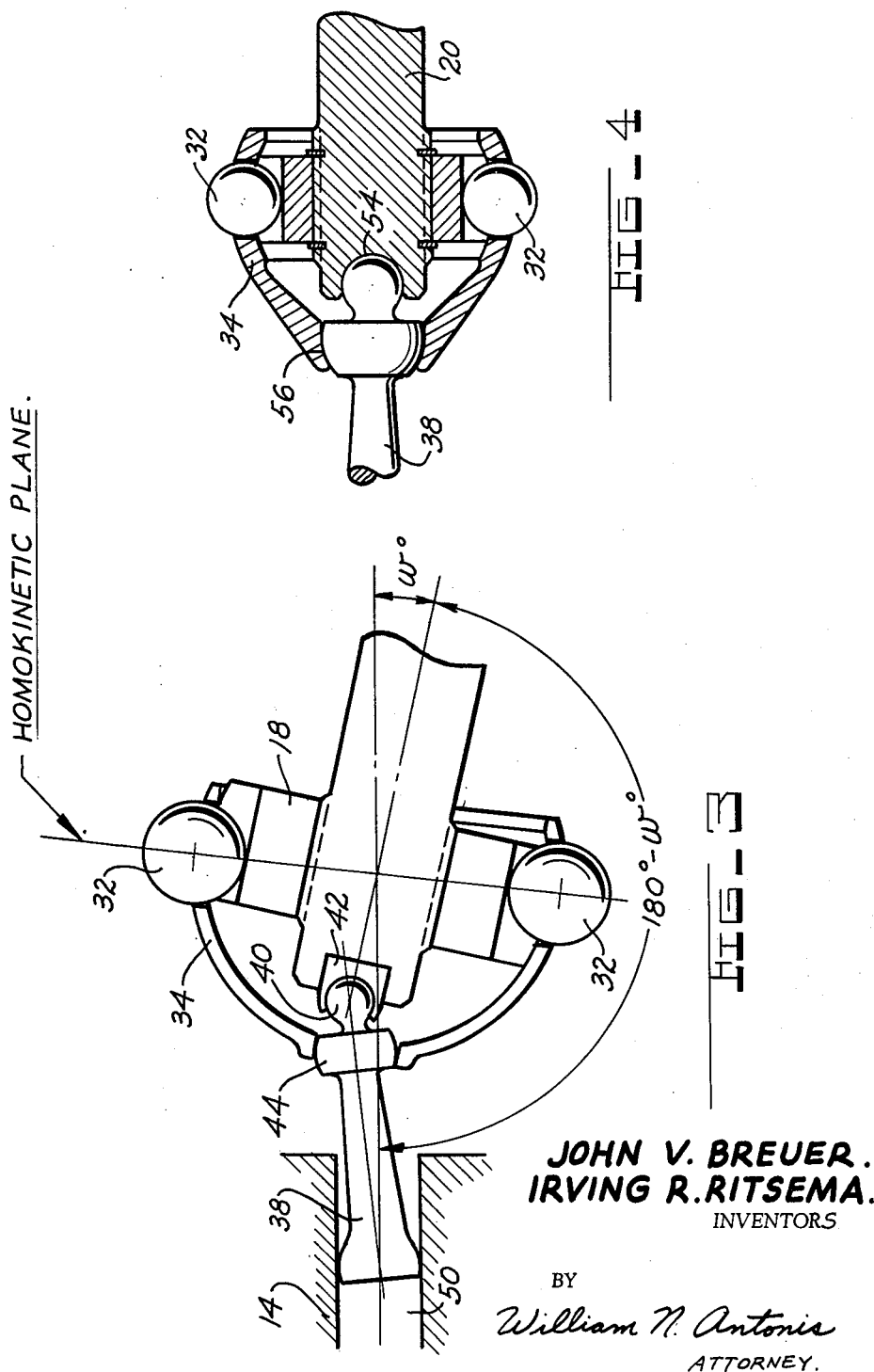

3,162,024
UNIVERSAL JOINT
John V. Breuer and Irving R. Ritsema, South Bend, Ind., assignors to The Bendix Corporation, South Bend, Ind., a corporation of Delaware
Filed Oct. 8, 1962, Ser. No. 228,968
2 Claims. (Cl. 64—8)

This invention relates to universal joints and more particularly to universal joints of the constant velocity type in which torque is transmitted from a primary (input) shaft to a secondary (output) shaft through a variable angle by means of power transmitting elements.

More specifically, this invention relates to improvements in a constant velocity universal joint of the type described in Rzeppa Patent No. 2,010,899 in which a plurality of balls are utilized to transmit rotary motion from an input shaft to an output shaft in such a manner that the speed ratio between the input and output shafts remains constant in all portions of the cycle of each rotation of shafts, no matter what the relative angular position of the shafts and their axes may be.

Although the universal joint described in the above-mentioned Rzeppa patent provides adequate angular motion between an input and output shaft, the structural arrangement of the joint is such that no end motion is permitted. In other words, no relative axial movement is permitted between the input and output shafts by the joint itself.

Accordingly, it is an object of his invention to provide a constant velocity universal joint which in and of itself will permit a substantial amount of relative axial movement between the input and output shafts at all angular positions of said shafts.

Another object of this invention is to provide a constant velocity universal joint having a maximum amount of end motion in a minimum amount of space.

A further object of this invention is to provide a constant velocity universal joint with a substantial amount of end motion which is relatively inexpensive to manufacture and is relatively easy to assemble and disassemble.

A still further object of this invention is to provide a universal joint that will have a low heat rise during operation thereof.

The above and other objects, features, and advantages of the invention will become apparent from the following description taken in connection with the accompanying drawings which form a part of this invention and in which:

FIGURE 1 is a sectional view through a universal joint constructed in accordance with our invention;

FIGURE 2 is a dimetric exploded view showing the components of the universal joint shown in FIGURE 1;

FIGURE 3 is a diagrammatical illustration of the universal joint shown in FIGURES 1 and 2; and FIGURE 4 is a sectional view showing a modified portion of our universal joint.

Referring to FIGURES 1 and 2, it will be seen that numeral 10 indicates an outer hollow cylindrical member which is adapted to be secured to the flange 12 of shaft 14 through suitable means such as bolts 16, only two of which are shown. A gasket 17 is located between the outer member 10 and flange 12 and is in sealing engagement therewith. An inner ring member 18 is located within the outer hollow cylindrical member 10 and is fixedly connected to shaft 20 through suitable means such as splines 22 and snap rings 24 and 26.

Formed on the inner cylindrical surface of the outer member 10 are six parallel straight race grooves 28 which are arranged to form cylindrical spaces with six corresponding parallel straight race grooves 30 formed on the outer cylindrical surface of inner ring member 18. Six power transmitting balls 32, one of which movably engages each corresponding set of straight race grooves 28 and 30, are utilized for transmitting torque from the outer member 10 to the inner member 18 or vice versa. In order to maintain all of the balls 32 in a common plane, a cage 34 having six slot type apertures 36, each of which contains one of the balls, is located intermediate the outer and inner members 10 and 18. As shown in FIGURE 3, in order for the device to transmit torque at constant angular velocity it is necessary to maintain the power transmitting balls 32 in a plane which bisects the supplementary angle $180°-\omega°$ formed by the shafts 14 and 20. This plane, that bisects the supplementary shaft angle, is known as the homokinetic plane. In the type of universal joint being described, the balls are kept in the homokinetic plane through positioning means which includes the previously described cage 34 and a lever 38 which is utilized to cause movement of the cage.

The lever 38 has a substantially spherical portion 40 formed at one end thereof which pivotally engages a socket bearing 42 located in the end of shaft 20 and an intermediate substantially spherical surface portion 44 which pivotally bears against a cylindrical bearing in flange 46 of cage 34. The other end 48 of lever 38 is located in a cylindrical axial recess 50 formed in shaft 14 and is formed for pivotal and unrestricted sliding engagement therein. It will be noted from FIGURE 1 that the socket bearing 42 includes a portion 52 which envelops and confines the spherical end portion 40 of the lever so that the lever and shaft 20 will move as a unit. Instead of confining the spherical end portion 40, as shown in FIGURE 1, the same effect may be achieved, as shown in FIGURE 4, by utilizing a socket recess 54 in shaft 20 for preventing movement in one direction and by utilizing a bearing surface 56 formed on cage 34 which partially surrounds the intermediate portion 44 of the lever and prevents movement of the lever in the opposite direction. In effect, the lever is confined between the shaft 20 and the cage 34. Thus, the described universal joint comprises two relatively movable unitary assemblies, one of which includes the outer hollow cylindrical member 10 and shaft 14, and the other of which includes the inner ring member 18, shaft 20, balls 32, cage 34 and lever 38.

In order to protect the universal joint from ingress of dirt and the escape of lubricant, it will be noted from FIGURE 1 that a flexible impervious boot 62 is connected to outer member 10 and to shaft 20 through suitable means such as clamps 64 and 66, respectively. Improved sealing engagement is provided by forming annular beads 68 and 70 on the boot for cooperation with annular groove 72 formed on outer member 10 and annular groove 74 formed on shaft 20.

Operation of the universal joint will be as follows: As illustrated in FIGURES 1 and 3, when the shafts 14 and 20 are moved angularly with respect to each other, the lever 38 will also move angularly with respect to the cylindrical recess 50 in shaft 14. During such angular adjustment the end 48 of lever 38 will be caused to pivot and slide axially in recess 50. At the same time the spherical end portion 40 and intermediate portion 44 will move in a direction away from the axis of shaft 14. As a result of such movement the intermediate portion 44 which bears against the cage 38 will cause angular movement of the cage. The amount of such angular movement is one-half the relative angular movement of the shafts which will have the effect of placing the balls in the homokinetic plane previously described.

By utilizing corresponding parallel straight race grooves 28 and 30 on the outer and inner members 10 and 18, respectively, it is possible to create a constant velocity universal joint which will provide substantial axial movement of one of the shafts 14 or 20 with respect to the other at all angular positions within the design parameters. It will be noted that in the configuration shown the axial motion or end motion is quite substantial and is limited only by holding ring 58 in one direction and by abutment of lever 38 with the blind end 60 of axial recess 50. The fact that the shafts 14 and 20 are moving axially with respect to each other as well as angularly with respect to each other does not affect the homokinetic plane of the balls, since the two unitary assemblies of the joint, which were previously described, are functionally in the same operative position for angular movements regardless of the relative axial positions therebetween.

In our universal joint, when the shafts are at an angle with respect to each other, the balls will roll in their respective race grooves as they are moved through their homokinetic plane. As the shafts move axially with respect to each other the balls will slide in their races. However, in most applications the shafts will never move axially without also moving through an angle and rotating. As a result there will never be true sliding but a combination of rolling and sliding.

The advantages and many applications of a constant velocity universal joint having a substantial amount of end motion which is inherent in the structural arrangement thereof will be obvious to those skilled in the art. Furthermore, although this invention has been described in connection with certain specific embodiments, it will be obvious to those skilled in the art that various changes may be made in the form, structure and arrangement of parts without departing from the spirit of the invention.

Accordingly, we do not desire to be limited to the specific embodiments disclosed herein primarily for purposes of illustration, but instead desire protection falling within the scope of the appended claims.

Having thus described the various features of the invention, what we claim as new and desire to secure by Letters Patent is:

1. In a universal joint comprising an outer member and an inner member, a plurality of power transmitting balls for transmitting torque from one of the members to the other of said members, and a cage intermediate said outer and inner members for maintaining all of said balls in a common plane, a lever for causing an angular movement of said cage which is substantially one-half the relative angular movement of said outer and inner members, said lever having one end thereof fixedly connected to said inner member through socket means enveloping and retaining the end of said lever to form a unitary assembly therewith and the other end thereof slidably connected to said outer member, said socket means being formed in the end of said inner member, and means for permitting substantial axial movement of one of said members with respect to the other of said members at all angular positions of said members, said means including a plurality of corresponding parallel straight race grooves formed in said outer and inner members for receiving said balls.

2. A universal joint having first and second unitary assemblies, said first unitary assembly comprising an outer hollow cylindrical member having a plurality of parallel axially extending straight race grooves formed within said member, said second unitary assembly comprising an inner ring member located within said outer hollow cylindrical member and having a plurality of parallel axially extending straight race grooves formed thereon for cooperating with the straight race grooves in said outer member to permit substantial axial movement of one of said assemblies with respect to the other of said assemblies, a plurality of power transmitting balls movably engaging said grooves of each of said members for transmitting torque from one of said assemblies to the other of said assemblies, a cage located intermediate said outer and inner members, said cage having apertures formed therein for receiving and retaining said balls in said race grooves and for maintaining said balls in a common plane, a lever for causing an angular movement of said cage which is substantially one-half the relative angular movement of said assemblies, said lever having a substantially spherical portion formed at one end thereof, and means for operatively connecting said inner member, balls, cage and lever to form said second unitary assembly, said last named means including socket means formed in one end of said inner member for enveloping and confining the spherical end portion of said lever.

References Cited in the file of this patent
UNITED STATES PATENTS

| | | |
|---|---|---|
| 2,010,899 | Rzeppa | Aug. 13, 1935 |
| 2,128,088 | Hanft | Aug. 23, 1938 |
| 2,264,728 | Stillwagon et al. | Dec. 2, 1941 |
| 2,352,776 | Dodge | July 4, 1944 |